(12) United States Patent
Kim et al.

(10) Patent No.: US 10,325,179 B1
(45) Date of Patent: Jun. 18, 2019

(54) LEARNING METHOD AND LEARNING DEVICE FOR POOLING ROI BY USING MASKING PARAMETERS TO BE USED FOR MOBILE DEVICES OR COMPACT NETWORKS VIA HARDWARE OPTIMIZATION, AND TESTING METHOD AND TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang (KR)

( * ) Notice: Subject to any disclaimer, the term of this patent is extended or adjusted under 35 U.S.C. 154(b) by 0 days.

(21) Appl. No.: 16/254,982

(22) Filed: Jan. 23, 2019

(51) Int. Cl.
*G06K 9/62* (2006.01)
*G06N 3/08* (2006.01)

(52) U.S. Cl.
CPC ......... *G06K 9/6231* (2013.01); *G06K 9/6232* (2013.01); *G06K 9/6256* (2013.01); *G06K 9/6261* (2013.01); *G06K 9/6262* (2013.01); *G06N 3/08* (2013.01)

(58) Field of Classification Search
CPC ........... G06T 7/143; G06T 2207/20081; G06T 2207/20084; G06T 2207/30256; G06K 9/6231; G06K 9/6232; G06K 9/6256; G06K 9/6261; G06K 9/6262; G06N 3/08
See application file for complete search history.

(56) References Cited

U.S. PATENT DOCUMENTS

| | | | |
|---|---|---|---|
| 9,558,268 B2* | 1/2017 | Tuzel | G06F 16/353 |
| 9,623,905 B2* | 4/2017 | Shashua | G01C 21/32 |
| 9,631,936 B2* | 4/2017 | Shashua | G01C 21/32 |
| 9,633,282 B2* | 4/2017 | Sharma | G06K 9/6256 |
| 9,665,100 B2* | 5/2017 | Shashua | G01C 21/32 |
| 9,710,714 B2* | 7/2017 | Chen | G06K 9/00798 |
| 9,767,381 B2* | 9/2017 | Rodriguez-Serrano | G06F 16/54 |

(Continued)

*Primary Examiner* — Manav Seth
(74) *Attorney, Agent, or Firm* — Xsensus LLP

(57) ABSTRACT

A method for pooling at least one ROI by using one or more masking parameters is provided. The method is applicable to mobile devices, compact networks, and the like via hardware optimization. The method includes steps of: (a) a computing device, if an input image is acquired, instructing a convolutional layer of a CNN to generate a feature map corresponding to the input image; (b) the computing device instructing an RPN of the CNN to determine the ROI corresponding to at least one object included in the input image by using the feature map; (c) the computing device instructing an ROI pooling layer of the CNN to apply each of pooling operations correspondingly to each of sub-regions in the ROI by referring to each of the masking parameters corresponding to each of the pooling operations, to thereby generate a masked pooled feature map.

24 Claims, 4 Drawing Sheets

(56) References Cited

U.S. PATENT DOCUMENTS

| | | | |
|---|---|---|---|
| 9,773,196 B2* | 9/2017 | Sachs | G06K 9/66 |
| 9,830,529 B2* | 11/2017 | Jetley | G06K 9/4671 |
| 9,881,234 B2* | 1/2018 | Huang | G06K 9/6232 |
| 9,916,679 B2* | 3/2018 | Flynn | G06T 15/20 |
| 9,934,440 B1* | 4/2018 | Kim | G06K 9/00791 |
| 9,940,539 B2* | 4/2018 | Han | G06K 9/6272 |
| 9,947,102 B2* | 4/2018 | Xu | G06K 9/6269 |
| 9,953,236 B1* | 4/2018 | Huang | G06K 9/34 |
| 9,965,705 B2* | 5/2018 | Chen | G06N 3/0454 |
| 9,965,719 B2* | 5/2018 | Choi | G06N 3/08 |
| 10,019,631 B2* | 7/2018 | Tao | G06K 9/00758 |
| 10,210,418 B2* | 2/2019 | Liu | G06T 7/11 |
| 10,223,610 B1* | 3/2019 | Akselrod-Ballin | G06K 9/6218 |
| 2016/0117587 A1* | 4/2016 | Yan | G06N 3/08 706/20 |
| 2016/0328630 A1* | 11/2016 | Han | G06K 9/6272 |
| 2016/0358321 A1* | 12/2016 | Xu | G06T 7/0002 |
| 2017/0147905 A1* | 5/2017 | Huang | G06K 9/6232 |
| 2017/0277977 A1* | 9/2017 | Kitamura | G06K 9/6267 |
| 2017/0308770 A1* | 10/2017 | Jetley | G06K 9/4671 |
| 2017/0336792 A1* | 11/2017 | Gdalyahu | G01C 21/32 |
| 2017/0364082 A1* | 12/2017 | Taieb | G01C 21/32 |
| 2018/0060648 A1* | 3/2018 | Yoo | G06K 9/00228 |
| 2018/0089834 A1* | 3/2018 | Spizhevoy | G06T 7/10 |
| 2018/0108137 A1* | 4/2018 | Price | G06T 7/11 |
| 2018/0129899 A1* | 5/2018 | Harron | G06K 9/34 |
| 2018/0137647 A1* | 5/2018 | Li | G06K 9/4671 |
| 2018/0157963 A1* | 6/2018 | Salti | G06N 3/0445 |
| 2018/0204111 A1* | 7/2018 | Zadeh | G06N 3/0436 |
| 2018/0217600 A1* | 8/2018 | Shashua | G01C 21/32 |
| 2019/0057507 A1* | 2/2019 | El-Khamy | G06T 7/11 |

* cited by examiner

US 10,325,179 B1

LEARNING METHOD AND LEARNING DEVICE FOR POOLING ROI BY USING MASKING PARAMETERS TO BE USED FOR MOBILE DEVICES OR COMPACT NETWORKS VIA HARDWARE OPTIMIZATION, AND TESTING METHOD AND TESTING DEVICE USING THE SAME

FIELD OF THE DISCLOSURE

The present disclosure relates to a method for pooling at least one ROI by using one or more masking parameters to be used for mobile devices or compact networks via hardware optimization; and more particularly, the method for pooling the ROI by using the masking parameters, including steps of: (a) if an input image is acquired, instructing a convolutional layer of a CNN to generate a feature map corresponding to the input image; (b) instructing an RPN of the CNN to determine the ROI corresponding to at least one object included in the input image by using the feature map; and (c) instructing an ROI pooling layer of the CNN to apply each of pooling operations correspondingly to each of sub-regions in the ROI by referring to each of the masking parameters corresponding to each of the pooling operations, to thereby generate a masked pooled feature map, and a computing device, a testing method, and a testing device using the same.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of the machine learning.

Meanwhile, ROI pooling is a pooling method by using each of representative feature values corresponding to each of sub-regions, wherein each of the sub-regions are included in at least one ROI, i.e., Region-Of-Interest, which is at least one important part of an input image, i.e. at least one part where at least one target object is located. The ROI pooling is widely used in the Machine Learning because it can reduce a computational load.

According to the conventional ROI pooling method, on condition that ROI corresponding to an object included in the input image is determined by an RPN, pooling operations are applied to respective sub-regions in the ROI. Through pooling operations, representative feature values corresponding to the sub-regions in the ROI are calculated. Herein, the representative feature values are generated by using each average of all feature values included in each sub-region or by using each largest value among all feature values included in each sub-region.

FIG. 4 shows a process of generating the representative feature values for the ROI pooling according to the conventional ROI pooling method.

By referring to FIG. 4, it may be seen that all feature values included in the sub-regions are used for generating the representative feature values.

However, the conventional ROI pooling method explained above has a critical disadvantage of inefficient memory access, because the sub-regions in the ROI are rectangles, though shapes of arbitrary objects included in arbitrary input images are various, generally not rectangles. Thus, there may be some unnecessary pixels which are included in the sub-regions but not included in the objects of the input image. These inefficient, needless accesses to the unnecessary pixels may cause distortion on the pooling result, or a drop of learning speed.

SUMMARY OF THE DISCLOSURE

It is an object of the present disclosure to solve all the problems explained above.

It is another object of the present disclosure to provide a ROI pooling method for optimized memory accesses by referring to masking parameters corresponding to feature values included in an ROI.

In accordance with one aspect of the present disclosure, there is provided a method for pooling at least one ROI by using one or more masking parameters, including steps of: (a) a computing device, if an input image is acquired, instructing a convolutional layer of a CNN to generate a feature map corresponding to the input image; (b) the computing device instructing an RPN of the CNN to determine the ROI corresponding to at least one object included in the input image by using the feature map; and (c) the computing device instructing an ROI pooling layer of the CNN to apply each of pooling operations correspondingly to each of sub-regions in the ROI by referring to each of the masking parameters corresponding to each of the pooling operations, to thereby generate a masked pooled feature map.

As one example, each of the masking parameters is determined as either a first value or a second value, and wherein, at the step of (c), the computing device instructs the ROI pooling layer to apply each of the pooling operations correspondingly to each of the sub-regions in the ROI by referring to information on whether each of the masking parameters is the first value or the second value, to thereby generate the masked pooled feature map.

As one example, if a specific masking parameter among the masking parameters is the first value, the computing device instructs the ROI pooling layer not to apply its corresponding pooling operation to its corresponding sub-region in the ROI.

As one example, the method further includes steps of: (d) the computing device instructing an output layer of the CNN to generate CNN output values by applying neural network operations to the masked pooled feature map; and (e) the computing device instructing a loss layer of the CNN to generate loss values by referring to the CNN output values and their corresponding GTs, and learning the masking parameters of the ROI pooling layer by backpropagating the loss values.

As one example, at the step of (e), the computing device further learns at least part of parameters included in the convolutional layer and the output layer by backpropagating the loss values.

As one example, each of the masking parameters is determined as either a first value or a second value, wherein, at the step of (c), the computing device instructs the ROI pooling layer to apply each of the pooling operations correspondingly to each of the sub-regions in the ROI by referring to information on whether each of the masking parameters is the first value or the second value, to thereby generate the masked pooled feature map, wherein, at the step of (c), the computing device instructs the ROI pooling layer to output each of representative feature values, as each component of the masked pooled feature map, and wherein each of the representative feature values is each of averages of feature values, included in each of the corresponding sub-regions in the ROI, whose corresponding masking parameters are the second value.

As one example, each of the masking parameters is determined as either a first value or a second value, wherein, at the step of (c), the computing device instructs the ROI pooling layer to apply each of the pooling operations correspondingly to each of the sub-regions in the ROI by referring to information on whether each of the masking parameters is the first value or the second value, to thereby generate the masked pooled feature map, wherein, at the step of (c), the computing device instructs the ROI pooling layer to output each of representative feature values, as each component of the masked pooled feature map, and wherein each of the representative feature values is each of largest ones among feature values, included in each of the corresponding sub-regions in the ROI, whose corresponding masking parameters are the second value.

In accordance with another aspect of the present disclosure, there is provided a testing method for pooling at least one ROI by using one or more masking parameters, including steps of: (a) on condition that (1) a computing device has instructed a convolutional layer of a CNN to generate a feature map for training corresponding to a training image, (2) the computing device has instructed an RPN of the CNN to determine the ROI for training corresponding to at least one object for training included in the training image by using the feature map for training, (3) the computing device has instructed an ROI pooling layer of the CNN to apply each of pooling operations correspondingly to each of sub-regions for training in the ROI for training by referring to each of the masking parameters corresponding to each of the pooling operations, to thereby generate a masked pooled feature map for training, (4) the computing device has instructed an output layer of the CNN to generate CNN output values for training by applying neural network operations to the masked pooled feature map for training, and (5) the computing device has instructed a loss layer of the CNN to generate loss values by referring to the CNN output values for training and their corresponding GTs, and learning the masking parameters of the ROI pooling layer by backpropagating the loss values, a testing device; if a test image is acquired, instructing the convolutional layer of the CNN to generate a feature map for testing corresponding to the test image; (b) the testing device instructing the RPN of the CNN to determine the ROI for testing corresponding to at least one object for testing included in the test image by using the feature map for testing; (c) the testing device instructing the ROI pooling layer of the CNN to apply each of the pooling operations correspondingly to each of sub-regions for testing in the ROI for testing by referring to each of the masking parameters corresponding to each of the pooling operations, to thereby generate a masked pooled feature map for testing; and (d) the testing device instructing the output layer of the CNN to generate CNN output values for testing by applying the neural network operations to the masked pooled feature map for testing.

As one example, each of the masking parameters is determined as either a first value or a second value, and wherein, at the step of (c), the testing device instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing.

As one example, if a specific masking parameter among the masking parameters is the first value, the testing device instructs the ROI pooling layer not to apply its corresponding pooling operation to its corresponding sub-region for testing in the ROI for testing.

As one example, each of the masking parameters is determined as either a first value or a second value, wherein, at the step of (c), the testing device instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing, wherein, at the step of (c), the testing device instructs the ROI pooling layer to output each of representative feature values for testing, as each component of the masked pooled feature map for testing, and wherein each of the representative feature values for testing is each of averages of feature values for testing, included in each of the corresponding sub-regions for testing in the ROI for testing, whose corresponding masking parameters are the second value.

As one example, each of the masking parameters is determined as either a first value or a second value, wherein, at the step of (c), the testing device instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing, wherein, at the step of (c), the testing device instructs the ROI pooling layer to output each of representative feature values for testing, as each component of the masked pooled feature map for testing, and wherein each of the representative feature values for testing is each of largest ones among feature values for testing, included in each of the corresponding sub-regions for testing in the ROI for testing, whose corresponding masking parameters are the second value.

In accordance with still another aspect of the present disclosure, there is provided a computing device for pooling at least one ROI by using one or more masking parameters, including: at least one memory that stores instructions; and at least one processor configured to execute the instructions to: perform processes of (I) instructing a convolutional layer of a CNN to generate a feature map corresponding to an input image; (II) instructing an RPN of the CNN to determine the ROI corresponding to at least one object included in the input image by using the feature map; and (III) instructing an ROI pooling layer of the CNN to apply each of pooling operations correspondingly to each of sub-regions in the ROI by referring to each of the masking parameters corresponding to each of the pooling operations, to thereby generate a masked pooled feature map.

As one example, each of the masking parameters is determined as either a first value or a second value, and wherein, at the process of (III), the processor instructs the ROI pooling layer to apply each of the pooling operations correspondingly to each of the sub-regions in the ROI by referring to information on whether each of the masking parameters is the first value or the second value, to thereby generate the masked pooled feature map.

As one example, if a specific masking parameter among the masking parameters is the first value, the processor instructs the ROI pooling layer not to apply its corresponding pooling operation to its corresponding sub-region in the ROI.

As one example, the processor further performs processes of: (IV) instructing an output layer of the CNN to generate CNN output values by applying neural network operations to the masked pooled feature map; (V) instructing a loss layer of the CNN to generate loss values by referring to the CNN output values and their corresponding GTs, and learning the masking parameters of the ROI pooling layer by backpropagating the loss values.

As one example, at the process of (V), the processor further learns at least part of parameters included in the convolutional layer and the output layer by backpropagating the loss values.

As one example, each of the masking parameters is determined as either a first value or a second value, wherein, at the process of (III), the processor instructs the ROI pooling layer to apply each of the pooling operations correspondingly to each of the sub-regions in the ROI by referring to information on whether each of the masking parameters is the first value or the second value, to thereby generate the masked pooled feature map, wherein, at the process of (III), the processor instructs the ROI pooling layer to output each of representative feature values, as each component of the masked pooled feature map, and wherein each of the representative feature values is each of averages of feature values, included in each of the corresponding sub-regions in the ROI, whose corresponding masking parameters are the second value.

As one example, each of the masking parameters is determined as either a first value or a second value, wherein, at the process of (III), the processor instructs the ROI pooling layer to apply each of the pooling operations correspondingly to each of the sub-regions in the ROI by referring to information on whether each of the masking parameters is the first value or the second value, to thereby generate the masked pooled feature map, wherein, at the process of (III), the processor instructs the ROI pooling layer to output each of representative feature values, as each component of the masked pooled feature map, and wherein each of the representative feature values is each of largest ones among feature values, included in each of the corresponding sub-regions in the ROI, whose corresponding masking parameters are the second value.

In accordance with still yet another aspect of the present disclosure, there is provided a testing device for pooling at least one ROI by using one or more masking parameters, including: at least one memory that stores instructions; and at least one processor, on condition that (1) a computing device has instructed a convolutional layer of a CNN to generate a feature map for training corresponding to a training image, (2) the computing device has instructed an RPN of the CNN to determine the ROI for training corresponding to at least one object for training included in the training image by using the feature map for training, (3) the computing device has instructed an ROI pooling layer of the CNN to apply each of pooling operations correspondingly to each of sub-regions for training in the ROI for training by referring to each of the masking parameters corresponding to each of the pooling operations, to thereby generate a masked pooled feature map for training, (4) the computing device has instructed an output layer of the CNN to generate CNN output values for training by applying neural network operations to the masked pooled feature map for training, and (5) the computing device has instructed a loss layer of the CNN to generate loss values by referring to the CNN output values for training and their corresponding GTs, and learning the masking parameters of the ROI pooling layer by backpropagating the loss values; configured to execute the instructions to: perform processes of (I) instructing the convolutional layer of the CNN to generate a feature map for testing corresponding to a test image; (II) instructing the RPN of the CNN to determine the ROI for testing corresponding to at least one object for testing included in the test image by using the feature map for testing; (III) instructing the ROI pooling layer of the CNN to apply each of the pooling operations correspondingly to each of sub-regions for testing in the ROI for testing by referring to each of the masking parameters corresponding to each of the pooling operations, to thereby generate a masked pooled feature map for testing; and (IV) instructing the output layer of the CNN to generate CNN output values for testing by applying the neural network operations to the masked pooled feature map for testing.

As one example, each of the masking parameters is determined as either a first value or a second value, and wherein, at the process of (III), the processor instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing.

As one example, if a specific masking parameter among the masking parameters is the first value, the processor instructs the ROI pooling layer not to apply its corresponding pooling operation to its corresponding sub-region for testing in the ROI for testing.

As one example, each of the masking parameters is determined as either a first value or a second value, wherein, at the process of (III), the processor instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing, wherein, at the process of (III), the processor instructs the ROI pooling layer to output each of representative feature values for testing, as each component of the masked pooled feature map for testing, and wherein each of the representative feature values for testing is each of averages of feature values for testing, included in each of the corresponding sub-regions for testing in the ROI for testing, whose corresponding masking parameters are the second value.

As one example, each of the masking parameters is determined as either a first value or a second value, wherein, at the process of (III), the processor instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing, wherein, at the process of (III), the processor instructs the ROI pooling layer to output each of representative feature values for testing, as each component of the masked pooled feature map for testing, and wherein each of the representative feature values for testing is each of largest ones among feature values for testing, included in each of the corresponding sub-regions for testing in the ROI for testing, whose corresponding masking parameters are the second value.

BRIEF DESCRIPTION OF THE DRAWINGS

The drawings attached below to explain example embodiments of the present disclosure are only part of example embodiments of the present disclosure and other drawings may be obtained based on the drawings without inventive work for those skilled in the art.

DETAILED DESCRIPTION OF THE PREFERRED EMBODIMENTS

Figure 1:
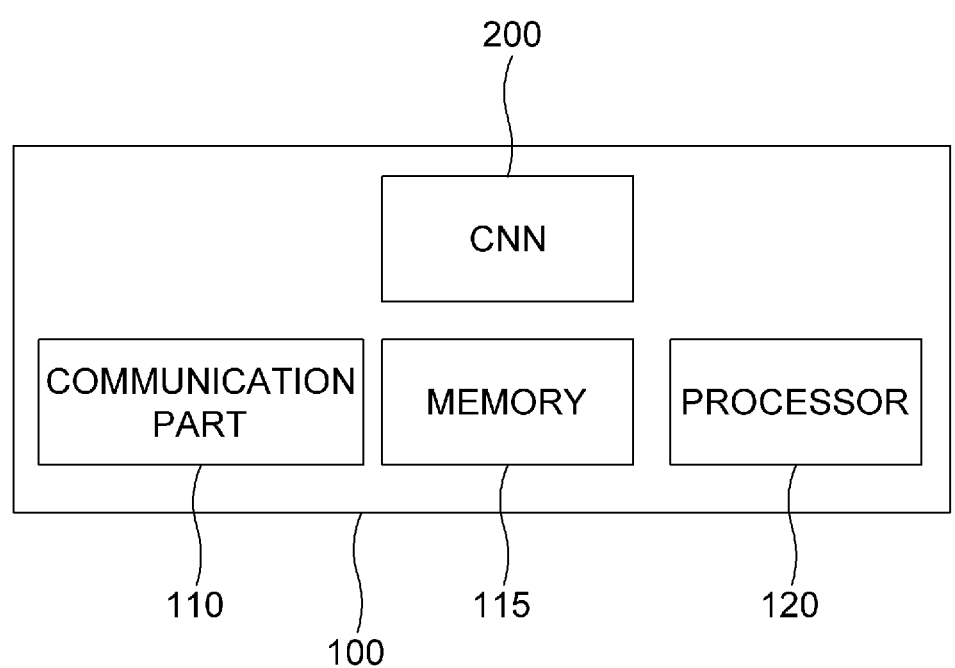
FIG. 1 shows a configuration of a computing device for learning an ROI pooling layer using masking parameters.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 shows a configuration of a computing device for learning an ROI pooling layer using masking parameters. Herein, the computing device may represent a learning device.

By referring to FIG. 1, the computing device 100 may include a CNN 200. Functions of inputting and outputting various data and those of operating the various data by the CNN 200 may be performed by a communication part 110 and a processor 120 therein respectively. But, in FIG. 1, detailed explanation on how the communication part 110 and the processor 120 are connected is omitted. In addition, the learning device may further include a memory 115 capable of storing computer readable instructions for performing following processes. As one example, the processor, the memory, a medium, etc. may be integrated with an integrated processor.

Figure 2:
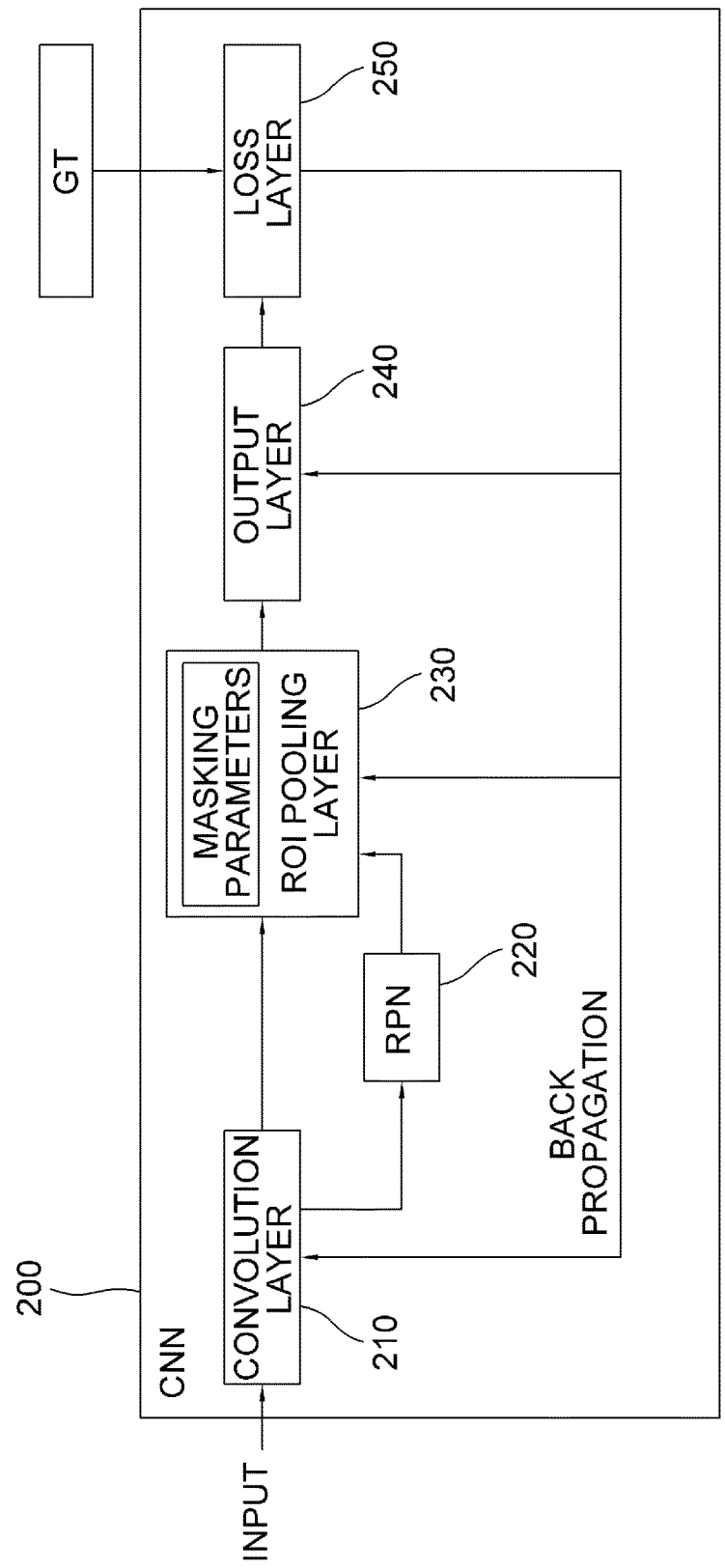
FIG. 2 shows a configuration of a CNN and a learning process in accordance with the present disclosure.

FIG. 2 shows a configuration of the CNN 200 and a learning process in accordance with the present disclosure.

By referring to FIG. 2, the CNN 200 may include a convolutional layer 210, an RPN 220, an ROI pooling layer 230, an output layer 240, and a loss layer 250.

First, the convolutional layer 210 may perform a process of generating a feature map by applying one or more convolution operations to an input image.

After, the RPN 220 may perform a process of determining at least one ROI corresponding to at least one object included in the input image by using the feature map. The feature map used for determining the ROI may be a feature map generated lastly by the convolutional layer 210, but it may not be limited to this.

The ROI pooling layer 230 may perform a process of generating a masked pooled feature map by applying each of pooling operations correspondingly to each of sub-regions in the ROI by referring to each of masking parameters corresponding to each of the pooling operations. Specific information about the masking parameters will be explained later.

And, the output layer 240 may perform a process of generating CNN output values by applying neural network operations to the masked pooled feature map. After, the loss layer 250 may perform a process of generating loss values by referring to the CNN output values and their corresponding GTs. The loss values may be backpropagated to thereby learn the masking parameters.

Above the configuration of the CNN and brief learning processes in accordance with the present disclosure were explained. Specific learning process and the information on the masking parameters will be explained below.

Meanwhile, the processes performed by the convolutional layer 210 and the RPN 220 were explained sufficiently above. Thus, explanation on the process performed by the convolutional layer 210 and the RPN 220 may be omitted.

Figure 3:
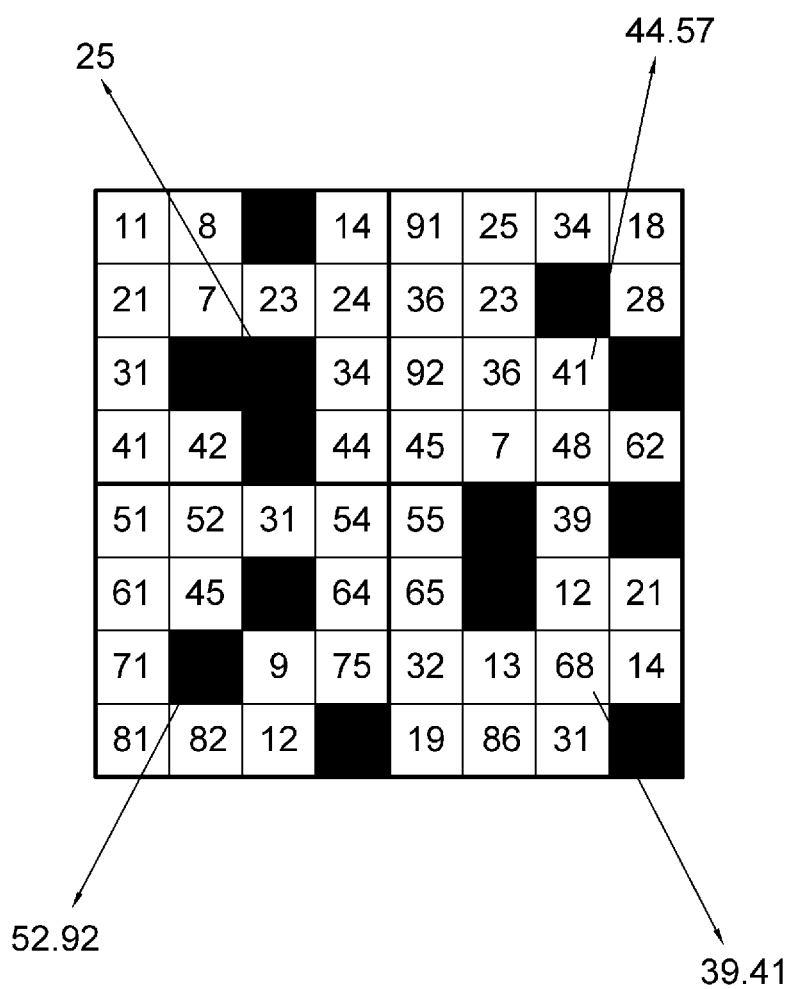
FIG. 3 shows a process of generating representative feature values in accordance with the present disclosure.
Figure 4:
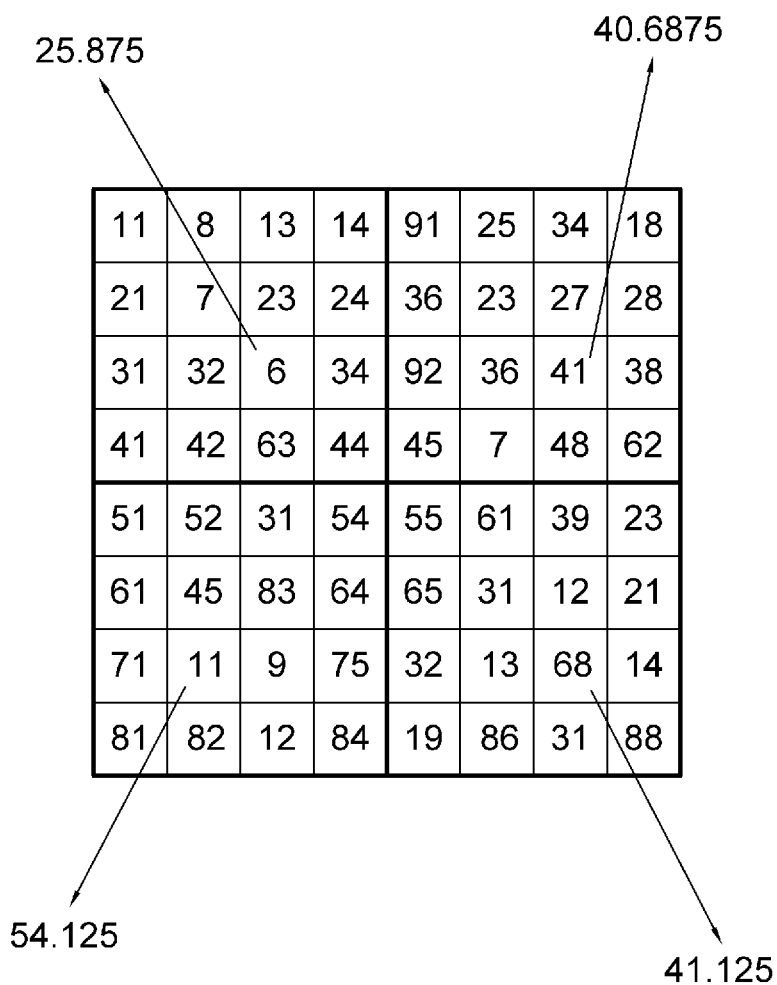
FIG. 4 shows a process of generating representative feature values according to the conventional ROI pooling method.

The process performed by the ROI pooling layer 230 may be explained by referring to FIG. 3.

FIG. 3 shows a process of generating representative feature values in accordance with the present disclosure.

By referring to FIG. 3, it may be seen that only some of values included in the sub-regions in the ROI were used for generating the representative feature values owing to the masking parameters.

Each of the masking parameters, corresponding to each of feature values included in the ROI, is determined as either a first value or a second value.

The computing device instructs the ROI pooling layer 230 to apply each of the pooling operations correspondingly to each of the sub-regions in the ROI by referring to information on whether each of the masking parameters is the first value or the second value, to thereby generate the masked pooled feature map. If a specific masking parameter among the masking parameters is the first value, the computing device instructs the ROI pooling layer not to apply its corresponding pooling operation to its corresponding sub-region in the ROI. Herein, the first value may be set to 0, and the second value may be set to 1.

The ROI pooling layer 230 may multiply each of the masking parameters and each of the feature values in the ROI element-wise, to thereby generate the representative feature values. In this way, a usage of computing resources may be reduced.

When applying the pooling operations, the computing device may instruct the ROI pooling layer to output each of the representative feature values, as each component of the masked pooled feature map. Herein, each of the representative feature values may be (i) each of averages of feature values, or (ii) each of largest ones among feature values, wherein the feature values used here are the feature values included in each of the corresponding sub-regions in the ROI, whose corresponding masking parameters are the second value.

Accordingly, an average pooling method or a max pooling method may be used. Although only an example on the average pooling method is shown in FIG. 3, it may be self-evident that the max pooling may be applied by following the methods shown above.

After the masked pooled feature map is generated as shown above, the output layer 240 may generate the CNN output values by applying the neural network operations to the masked pooled feature map. The neural network operations may be for an image segmentation, an object detection or a clustering, but it may not be limited to this.

As the CNN output values are generated, the loss layer 250 may generate the loss values by referring to the CNN output values and their corresponding GTs. The loss values may be backpropagated to thereby learn the masking parameters of the ROI pooling layer 230. Herein, at least part of the parameters included in the convolutional layer 210 and the output layer 240 may be further learned in the backpropagation process.

Above the learning process in accordance with the present disclosure was explained. Below a configuration of a testing device in accordance with the present disclosure and difference between the testing device and the learning device will be explained.

For reference, in the description below, the phrase "for training" is added for terms related to the learning processes, and the phrase "for testing" is added for terms related to testing processes, to avoid possible confusion.

First, on condition that (1) the computing device 100 has instructed the convolutional layer 210 of the CNN 200 to generate the feature map for training corresponding to the training image; (2) the computing device 100 has instructed the RPN 220 of the CNN 200 to determine the ROI for training corresponding to at least one object for training included in the training image by using the feature map for training; (3) the computing device 100 has instructed the ROI pooling layer 230 of the CNN 200 to apply each of the pooling operations correspondingly to each of the sub-regions for training in the ROI for training by referring to each of the masking parameters corresponding to each of the pooling operations, to thereby generate the masked pooled feature map for training; (4) the computing device 100 has instructed the output layer 240 of the CNN 200 to generate CNN output values for training by applying neural network operations to the masked pooled feature map for training; (5) the computing device 100 has instructed the loss layer 250 of the CNN 200 to generate loss values by referring to the CNN output values for training and their corresponding GTs, and learning the masking parameters of the ROI pooling layer 230 by backpropagating the loss values, a testing device, if a test image is acquired, may instruct the convolutional layer of the CNN to generate a feature map for testing corresponding to the test image.

Second, the testing device may instruct the RPN of the CNN to determine the ROI for testing corresponding to at least one object for testing included in the test image by using the feature map for testing.

Third, the testing device may instruct the ROI pooling layer of the CNN to apply each of the pooling operations correspondingly to each of sub-regions for testing in the ROI for testing by referring to each of the masking parameters corresponding to each of the pooling operations, to thereby generate a masked pooled feature map for testing.

Finally, the testing device may instruct the output layer of the CNN to generate CNN output values for testing by applying the neural network operations to the masked pooled feature map for testing.

Because the parameters of the convolutional layer 210, the ROI pooling layer 230 and the output layer 240 has been learned at the time of testing, the processes of generating the loss values and backpropagating the loss values may be omitted. Accordingly, the configuration of the testing device is the same to the configuration of the computing device 100 except the part for generating the loss values.

It is an advantage of the present disclosure to provide a ROI pooling method for optimizing memory accesses by referring to the masking parameters corresponding to the feature values included in the ROI to thereby select feature values to be used for ROI pooling.

The ROI pooling method is applicable to mobile devices, compact networks, and the like via hardware optimization.

The objects of the technical solution of the present disclosure or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present disclosure or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present disclosure and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present disclosure has been explained by specific matters such as detailed components, limited embodiments, and drawings. While the disclosure has been shown and described with respect to the preferred embodiments, it, however, will be understood by those skilled in the art that various changes and modification may be made without departing from the spirit and scope of the disclosure as defined in the following claims.

Accordingly, the thought of the present disclosure must not be confined to the explained embodiments, and the following patent claims as well as everything including variants equal or equivalent to the patent claims pertain to the category of the thought of the present disclosure.

What is claimed is:

1. A method for pooling at least one ROI by using one or more masking parameters, comprising steps of:
   (a) a computing device, if an input image is acquired, instructing a convolutional layer of a CNN to generate a feature map corresponding to the input image;
   (b) the computing device instructing an RPN of the CNN to determine the ROI corresponding to at least one object included in the input image by using the feature map; and
   (c) the computing device instructing an ROI pooling layer of the CNN to apply each of pooling operations correspondingly to each of sub-regions in the ROI by referring to each of the masking parameters corresponding to each of the pooling operations, to thereby generate a masked pooled feature map.

2. The method of claim 1, wherein, each of the masking parameters is determined as either a first value or a second value, and
   wherein, at the step of (c), the computing device instructs the ROI pooling layer to apply each of the pooling operations correspondingly to each of the sub-regions in the ROI by referring to information on whether each of the masking parameters is the first value or the second value, to thereby generate the masked pooled feature map.

3. The method of claim 2, wherein, if a specific masking parameter among the masking parameters is the first value, the computing device instructs the ROI pooling layer not to apply its corresponding pooling operation to its corresponding sub-region in the ROI.

4. The method of claim 1, further comprising steps of:
   (d) the computing device instructing an output layer of the CNN to generate CNN output values by applying neural network operations to the masked pooled feature map; and
   (e) the computing device instructing a loss layer of the CNN to generate loss values by referring to the CNN output values and their corresponding GTs, and learning the masking parameters of the ROI pooling layer by backpropagating the loss values.

5. The method of claim 4, wherein, at the step of (e), the computing device further learns at least part of parameters included in the convolutional layer and the output layer by backpropagating the loss values.

6. The method of claim 1, wherein, each of the masking parameters is determined as either a first value or a second value,
   wherein, at the step of (c), the computing device instructs the ROI pooling layer to apply each of the pooling operations correspondingly to each of the sub-regions in the ROI by referring to information on whether each of the masking parameters is the first value or the second value, to thereby generate the masked pooled feature map,
   wherein, at the step of (c), the computing device instructs the ROI pooling layer to output each of representative feature values, as each component of the masked pooled feature map, and
   wherein each of the representative feature values is each of averages of feature values, included in each of the corresponding sub-regions in the ROI, whose corresponding masking parameters are the second value.

7. The method of claim 1, wherein, each of the masking parameters is determined as either a first value or a second value,
   wherein, at the step of (c), the computing device instructs the ROI pooling layer to apply each of the pooling operations correspondingly to each of the sub-regions in the ROI by referring to information on whether each of the masking parameters is the first value or the second value, to thereby generate the masked pooled feature map,
   wherein, at the step of (c), the computing device instructs the ROI pooling layer to output each of representative feature values, as each component of the masked pooled feature map, and
   wherein each of the representative feature values is each of largest ones among feature values, included in each of the corresponding sub-regions in the ROI, whose corresponding masking parameters are the second value.

8. A testing method for pooling at least one ROI by using one or more masking parameters, comprising steps of:
   (a) on condition that (1) a computing device has instructed a convolutional layer of a CNN to generate a feature map for training corresponding to a training image, (2) the computing device has instructed an RPN of the CNN to determine the ROI for training corresponding to at least one object for training included in the training image by using the feature map for training, (3) the computing device has instructed an ROI pooling layer of the CNN to apply each of pooling operations correspondingly to each of sub-regions for training in the ROI for training by referring to each of the masking parameters corresponding to each of the pooling operations, to thereby generate a masked pooled feature map for training, (4) the computing device has instructed an output layer of the CNN to generate CNN output values for training by applying neural network operations to the masked pooled feature map for training, and (5) the computing device has instructed a loss layer of the CNN to generate loss values by referring to the CNN output values for training and their corresponding GTs, and learning the masking parameters of the ROI pooling layer by backpropagating the loss values; a testing device, if a test image is acquired, instructing the convolutional layer of the CNN to generate a feature map for testing corresponding to the test image;
   (b) the testing device instructing the RPN of the CNN to determine the ROI for testing corresponding to at least one object for testing included in the test image by using the feature map for testing;

(c) the testing device instructing the ROI pooling layer of the CNN to apply each of the pooling operations correspondingly to each of sub-regions for testing in the ROI for testing by referring to each of the masking parameters corresponding to each of the pooling operations, to thereby generate a masked pooled feature map for testing; and (d) the testing device instructing the output layer of the CNN to generate CNN output values for testing by applying the neural network operations to the masked pooled feature map for testing.

9. The testing method of claim 8, wherein, each of the masking parameters is determined as either a first value or a second value, and wherein, at the step of (c), the testing device instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing.

10. The method of claim 9, wherein, if a specific masking parameter among the masking parameters is the first value, the computing device instructs the ROI pooling layer not to apply its corresponding pooling operation to its corresponding sub-region for testing in the ROI for testing.

11. The method of claim 8, wherein, each of the masking parameters is determined as either a first value or a second value, wherein, at the step of (c), the testing device instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing, wherein, at the step of (c), the testing device instructs the ROI pooling layer to output each of representative feature values for testing, as each component of the masked pooled feature map for testing, and wherein each of the representative feature values for testing is each of averages of feature values for testing, included in each of the corresponding sub-regions for testing in the ROI for testing, whose corresponding masking parameters are the second value.

12. The method of claim 8, wherein, each of the masking parameters is determined as either a first value or a second value, wherein, at the step of (c), the testing device instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing, wherein, at the step of (c), the testing device instructs the ROI pooling layer to output each of representative feature values for testing, as each component of the masked pooled feature map for testing, and wherein each of the representative feature values for testing is each of largest ones among feature values for testing, included in each of the corresponding sub-regions for testing in the ROI for testing, whose corresponding masking parameters are the second value.

13. A computing device for pooling at least one ROI by using one or more masking parameters, comprising:
at least one memory that stores instructions; and
at least one processor configured to execute the instructions to: perform processes of (I) instructing a convolutional layer of a CNN to generate a feature map corresponding to an input image; (II) instructing an RPN of the CNN to determine the ROI corresponding to at least one object included in the input image by using the feature map; and (III) instructing an ROI pooling layer of the CNN to apply each of pooling operations correspondingly to each of sub-regions in the ROI by referring to each of the masking parameters corresponding to each of the pooling operations, to thereby generate a masked pooled feature map.

14. The computing device of claim 13, wherein, each of the masking parameters is determined as either a first value or a second value, and wherein, at the process of (III), the processor instructs the ROI pooling layer to apply each of the pooling operations correspondingly to each of the sub-regions in the ROI by referring to information on whether each of the masking parameters is the first value or the second value, to thereby generate the masked pooled feature map.

15. The computing device of claim 14, wherein, if a specific masking parameter among the masking parameters is the first value, the processor instructs the ROI pooling layer not to apply its corresponding pooling operation to its corresponding sub-region in the ROI.

16. The computing device of claim 13, wherein the processor further performs processes of: (IV) instructing an output layer of the CNN to generate CNN output values by applying neural network operations to the masked pooled feature map; (V) instructing a loss layer of the CNN to generate loss values by referring to the CNN output values and their corresponding GTs, and learning the masking parameters of the ROI pooling layer by backpropagating the loss values.

17. The computing device of claim 16, wherein, at the process of (V), the processor further learns at least part of parameters included in the convolutional layer and the output layer by backpropagating the loss values.

18. The computing device of claim 13, wherein, each of the masking parameters is determined as either a first value or a second value, wherein, at the process of (III), the processor instructs the ROI pooling layer to apply each of the pooling operations correspondingly to each of the sub-regions in the ROI by referring to information on whether each of the masking parameters is the first value or the second value, to thereby generate the masked pooled feature map, wherein, at the process of (III), the processor instructs the ROI pooling layer to output each of representative feature values, as each component of the masked pooled feature map, and wherein each of the representative feature values is each of averages of feature values, included in each of the corresponding sub-regions in the ROI, whose corresponding masking parameters are the second value.

19. The computing device of claim 13, wherein, each of the masking parameters is determined as either a first value or a second value, wherein, at the process of (III), the processor instructs the ROI pooling layer to apply each of the pooling operations correspondingly to each of the sub-regions in the ROI by referring to information on whether each of the masking parameters is the first value or the second value, to thereby generate the masked pooled feature map, wherein, at the process of (III), the processor instructs the ROI pooling layer to output each of representative feature values, as each component of the masked pooled feature map, and wherein each of the representative feature values is each of largest ones among feature values, included in each of the corresponding sub-regions in the ROI, whose corresponding masking parameters are the second value.

20. A testing device for pooling at least one ROI by using one or more masking parameters, comprising:

at least one memory that stores instructions; and at least one processor, on condition that (1) a computing device has instructed a convolutional layer of a CNN to generate a feature map for training corresponding to a training image, (2) the computing device has instructed an RPN of the CNN to determine the ROI for training corresponding to at least one object for training included in the training image by using the feature map for training, (3) the computing device has instructed an ROI pooling layer of the CNN to apply each of pooling operations correspondingly to each of sub-regions for training in the ROI for training by referring to each of the masking parameters corresponding to each of the pooling operations, to thereby generate a masked pooled feature map for training, (4) the computing device has instructed an output layer of the CNN to generate CNN output values for training by applying neural network operations to the masked pooled feature map for training, and (5) the computing device has instructed a loss layer of the CNN to generate loss values by referring to the CNN output values for training and their corresponding GTs, and learning the masking parameters of the ROI pooling layer by backpropagating; the loss values; configured to execute the instructions to: perform processes of (I) instructing the convolutional layer of the CNN to generate a feature map for testing corresponding to a test image; (II) instructing the RPN of the CNN to determine the ROI for testing corresponding to at least one object for testing included in the test image by using the feature map for testing; (III) instructing the ROI pooling layer of the CNN to apply each of the pooling operations correspondingly to each of sub-regions for testing in the ROI for testing by referring to each of the masking parameters corresponding to each of the pooling operations, to thereby generate a masked pooled feature map for testing; and (IV) instructing the output layer of the CNN to generate CNN output values for testing by applying the neural network operations to the masked pooled feature map for testing.

21. The testing device of claim 20, wherein, each of the masking parameters is determined as either a first value or a second value, and wherein, at the process of (III), the processor instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing.

22. The testing device of claim 21, wherein, if a specific masking parameter among the masking parameters is the first value, the processor instructs the ROI pooling layer not to apply its corresponding pooling operation to its corresponding sub-region for testing in the ROI for testing.

23. The testing device of claim 20, wherein, each of the masking parameters is determined as either a first value or a second value, wherein, at the process of (III), the processor instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing, wherein, at the process of (III), the processor instructs the ROI pooling layer to output each of representative feature values for testing, as each component of the masked pooled feature map for testing, and wherein each of the representative feature values for testing is each of averages of feature values for testing, included in each of the corresponding sub-regions for testing in the ROI for testing, whose corresponding masking parameters are the second value.

24. The testing device of claim 20, wherein, each of the masking parameters is determined as either a first value or a second value, wherein, at the process of (III), the processor instructs the ROI pooling layer to apply each of the pooling operations correspondingly to each of the sub-regions for testing in the ROI for testing by referring to information on whether each of the masking parameters is the first value or the second value, to thereby generate the masked pooled feature map for testing, wherein, at the process of (III), the processor instructs the ROI pooling layer to output each of representative feature values for testing, as each component of the masked pooled feature map for testing, and wherein each of the representative feature values for testing is each of largest ones among feature values for testing, included in each of the corresponding sub-regions for testing in the ROI for testing, whose corresponding masking parameters are the second value.

* * * * *